United States Patent
Hsiao et al.

(10) Patent No.: US 11,052,348 B2
(45) Date of Patent: Jul. 6, 2021

(54) METHOD FOR REMOVING BORON

(71) Applicant: INDUSTRIAL TECHNOLOGY RESEARCH INSTITUTE, Hsinchu (TW)

(72) Inventors: Ta-Ching Hsiao, Zhudong Township (TW); Chu-Pi Jeng, Hsinchu (TW); Kuo-Lun Huang, Hsinchu (TW); Mu-Hsi Sung, Hsinchu (TW); Keng-Yang Chen, Zhudong Township (TW); Li-Duan Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 582 days.

(21) Appl. No.: 15/854,375

(22) Filed: Dec. 26, 2017

(65) Prior Publication Data

US 2019/0176085 A1 Jun. 13, 2019

(30) Foreign Application Priority Data

Dec. 7, 2017 (TW) .................................. 106142908

(51) Int. Cl.
*B01D 53/46* (2006.01)
*C01B 32/984* (2017.01)
(Continued)

(52) U.S. Cl.
CPC .............. *B01D 53/46* (2013.01); *B01J 3/006* (2013.01); *B01J 8/0095* (2013.01); *B01J 8/0278* (2013.01);
(Continued)

(58) Field of Classification Search
CPC ......... B01D 53/46; B01J 3/006; B01J 8/0095; B01J 8/0278; C01B 32/20; C01B 32/97; C01B 32/984; C01B 35/023
See application file for complete search history.

(56) References Cited

U.S. PATENT DOCUMENTS 4,256,717 A    3/1981    Dawless
4,298,423 A    11/1981    Lindmayer
(Continued)

FOREIGN PATENT DOCUMENTS

CN      1105081 C     4/2003
CN    101555015 A    10/2009
(Continued)

OTHER PUBLICATIONS

Alemany et al., "Refining of metallurgical-grade silicon by inductive plasma", Solar Energy Materials & Solar Cells, 2002, vol. 72, pp. 41-48.
(Continued)

*Primary Examiner* — Allan R Wilson
(74) *Attorney, Agent, or Firm* — Birch, Stewart, Kolasch & Birch, LLP

(57) ABSTRACT

A method for removing boron is provided, which includes (a) mixing a carbon source material and a silicon source material in a chamber to form a solid state mixture, (b) heating the solid state mixture to a temperature of 1000° C. to 1600° C., and adjusting the pressure of the chamber to 1 torr to 100 torr. The method also includes (c) conducting a gas mixture of a first carrier gas and water vapor into the chamber to remove boron from the solid state mixture, and (d) conducting a second carrier gas into the chamber.

8 Claims, 1 Drawing Sheet

(51) Int. Cl.

| | | |
|---|---|---|
| *C01B 35/02* | (2006.01) | |
| *C01B 32/97* | (2017.01) | |
| *C01B 32/20* | (2017.01) | |
| *B01J 3/00* | (2006.01) | |
| *B01J 8/02* | (2006.01) | |
| *B01J 8/00* | (2006.01) | |

(52) U.S. Cl.
CPC .............. *C01B 32/20* (2017.08); *C01B 32/97* (2017.08); *C01B 32/984* (2017.08); *C01B 35/023* (2013.01); *B01D 2257/10* (2013.01)

(56) References Cited

U.S. PATENT DOCUMENTS

| | | | |
|---|---|---|---|
| 5,788,945 | A | 8/1998 | Schei |
| 6,022,820 | A | 2/2000 | Sacks |
| 2005/0139148 | A1 | 6/2005 | Fujiwara et al. |
| 2008/0254271 | A1* | 10/2008 | Komiyama ............. C04B 35/78 428/220 |
| 2011/0175024 | A1* | 7/2011 | Lang ..................... C04B 35/565 252/182.32 |
| 2011/0186111 | A1* | 8/2011 | Straboni ............. H01L 31/0465 136/249 |

FOREIGN PATENT DOCUMENTS

| | | |
|---|---|---|
| CN | 102627394 A | 8/2012 |
| CN | 103086378 B | 7/2014 |
| CN | 105329902 A | 2/2016 |
| TW | 200928019 | 7/2009 |
| TW | 201026604 A1 | 7/2010 |
| TW | 201231392 A1 | 8/2012 |
| TW | I443237 | 7/2014 |
| WO | WO 2014/586696 A1 | 4/2014 |

OTHER PUBLICATIONS

Bai et al., "Effect of Ti addition on B removal during silicon refining in Al-30%Si alloy directional solidification", Elsevier, Separation and Purification Technology, 2017, vol. 174, pp. 345-351.

Le et al., "Improved removal of boron from metallurgical-grade Si by CaO—SiO2—CaCl2 slag refining with intermittent CaCl2 addition", Elsevier, Vacuum, 2017, vol. 143, pp. 7-13.

Morito et al., "Boron removal by dissolution and recrystallization of silicon in a sodium-silicon solution", Elsevier, Separation and Purification Technology, 2013, vol. 118, pp. 723-726.

Nakamura et al., "Boron Removal in Molten Silicon with Steam Added Plasma Melting Method", J. Japan Inst. Metals, 2003, vol. 67, No. 10, pp. 583-589.

Tan et al., "New method for boron removal from silicon by electron beam injection", Elsevier Materials Science in Semiconductor Processing, 2014, vol. 18, pp. 42-45.

Wu et al., "Boron removal in purifying metallurgical grade silicon by CaO—SiO2 slag refining", Elsevier, Trans. Nonferrous Met. Soc. China, 2014, vol. 24, pp. 1231-1236.

Taiwanese Office Action and Search Report, dated May 7, 2018, for Taiwanese Appliation No. 106142908.

* cited by examiner

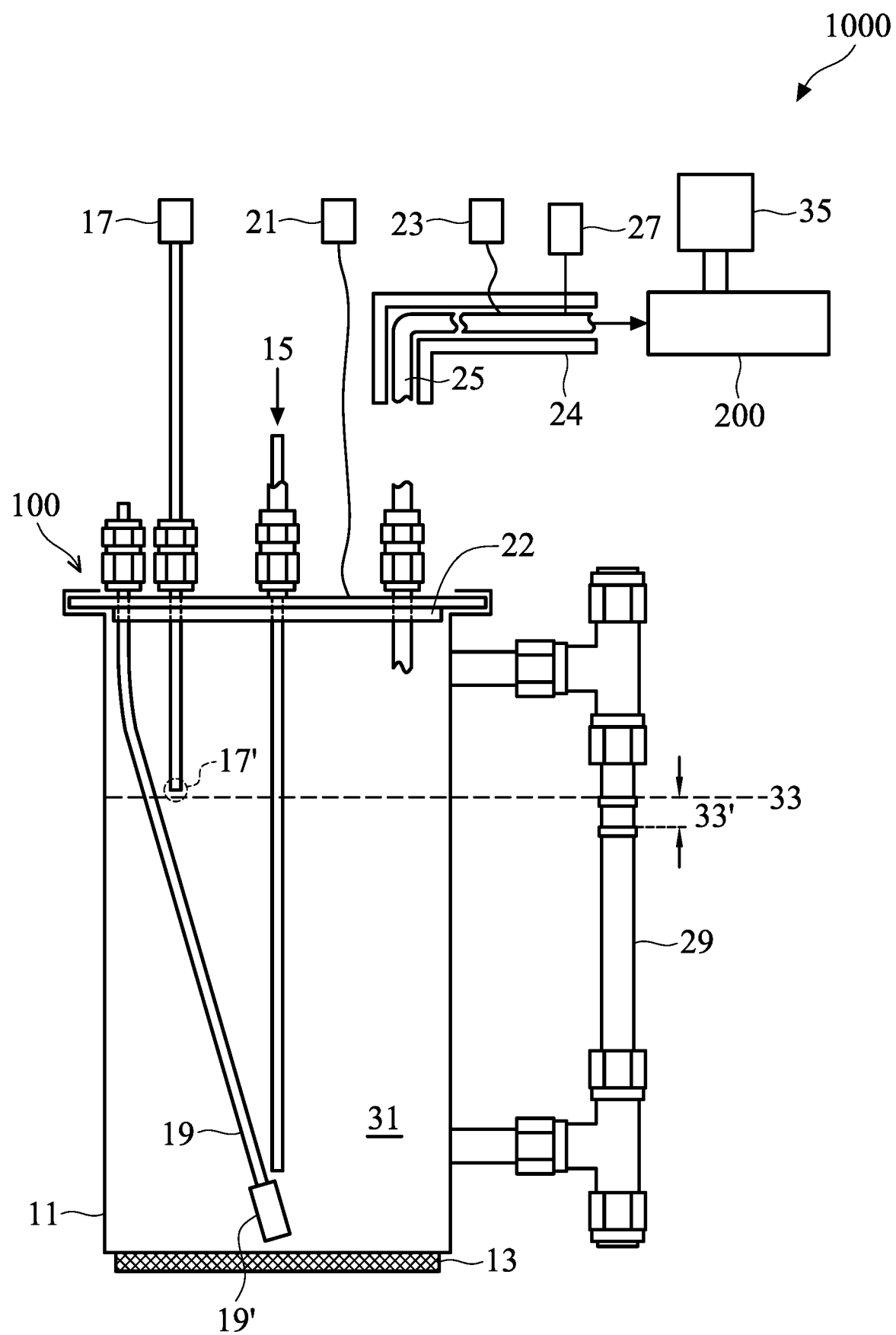

METHOD FOR REMOVING BORON

CROSS REFERENCE TO RELATED APPLICATIONS

The present application is based on, and claims priority from, Taiwan Application Serial Number 106142908, filed on Dec. 7, 2017, the disclosure of which is hereby incorporated by reference herein in its entirety.

TECHNICAL FIELD

The technical field relates to a method for removing boron, and a method for removing boron from silicon carbide.

BACKGROUND

Silicon carbide is an important semiconductor material with a wide band, high breakdown voltage, high electron drift velocity, high thermal conductivity, and the like. As such, silicon carbide is an excellent selection for high-power and high-voltage devices, which also has an excellent energy-saving effect. The silicon carbide single crystal is usually grown by physical vapor transport (PVT), in which silicon carbide powder of high purity serves as a raw material to be sublimated by heating to a temperature over 2000° C. A temperature gradient is produced in a crystal growth zone, such that the sublimated gas is gradually deposited on seed locations in a cold zone to grow crystals. Accordingly, the purity of the powder is critical in the single crystal growth of the silicon carbide. The powder properties are highly related to the quality of the crystals that are grown, and in particular the impurities contained in the powder may be transferred into an internal part of a crystal during crystal growth by sublimation. These impurities are one of the major reasons for defects affecting the electrical performance of chips.

The III group elemental impurities (e.g. boron) have a higher activity on the crystal growth surface, which are a major carrier source, and easily produce defects. Most of the conventional conductive chips are n-type such as nitrogen-doped, such that the concentration control of the III group element is particularly important. For example, the combination of holes produced by the III group element and electrons of the doped element should be avoided, because the combination may offset the conductive effect. In addition, the boron has a high solid solubility in silicon carbide (e.g. greater than or equal to $10^{20}/cm^3$), and the boron in the crystal may aggregate or even produce inclusion due to non-uniform distribution. The inclusion of boron is directly related to the defects (such as micropipe and dislocation) in the chip. Therefore, boron not only affects the electrical performance but also easily produces defects. However, the boron is difficultly separated from the silicon carbide by segregation due to the high solid solubility of boron in silicon carbide. The boron has a high melting point and a relatively low vapor pressure. For example, the melting point of boron is 2076° C., which is higher than the general synthesis temperature of the silicon carbide powder. In other words, the boron is difficultly removed by a gas-solid separation utilizing the temperature difference. Accordingly, a novel method for removing boron to purify the silicon carbide is called for.

SUMMARY

One embodiment of the disclosure provides a method for removing boron, including: (a) mixing a carbon source material and a silicon source material in a chamber to form a solid state mixture; (b) heating the solid state mixture to a temperature of 1000° C. to 1600° C., and adjusting the pressure of the chamber to 1 torr to 100 torr; (c) conducting a gas mixture of a first carrier gas and water vapor into the chamber to remove boron from the solid state mixture; and (d) conducting a second carrier gas into the chamber.

One embodiment provides an apparatus for removing boron, including: a chamber for containing a solid state mixture of a carbon source material and a silicon carbon source; a carrier gas source for transferring a first carrier gas to the chamber; and a humidifier connected to the chamber for transferring a gas mixture of a second carrier gas and water vapor to the chamber, wherein the humidifier includes: a body for containing water; a first heating element at a bottom of the body for heating the water to form the water vapor; an inlet pipe for conducting the second carrier gas into the water to form the gas mixture of the second carrier gas and the water vapor; an outlet pipe for transferring the gas mixture of the second carrier gas and the water vapor into the chamber; and a liquid level meter connected to the body and disposed at a side of the body for detecting the water level in the body.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows an apparatus for removing boron in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

One embodiment of the disclosure provides a method for removing boron, including (a) mixing a carbon source material and a silicon source material in a chamber to form a solid state mixture. The chamber can be located in a high-temperature furnace to perform the following heating steps. In one embodiment, the carbon source material includes carbon black, graphite, graphene, carbon nanotube, another suitable carbon source material, or a combination thereof. The carbon source material may be several micrometers to 100 micrometers in size, such as from 1 micrometer to 100 micrometers. Carbon source material that is too small may cause the silicon carbide powder to be too small, and the cost of the carbon source material is expensive. Carbon source material that is too large may result in a non-uniform reaction. In one embodiment, the silicon source material can be silicon, silicon oxide, another suitable silicon source material, or a combination thereof. The silicon source material may have be hundreds of nanometers to hundreds of micrometers in size, such as from 100 nanometers to 1000 micrometers, or from 300 nanometers to 500 micrometers. Silicon source material that is too small may affect the production yield due to the package density of the raw materials being too low. Silicon source material that is too large may result in a non-uniform reaction.

After step (a), the solid state mixture is heated to a temperature of between 1000° C. to 1600° C., and the chamber pressure is adjusted to a pressure of between 1 torr to 100 torr in step (b). If the solid state mixture is heated to too low a temperature, the water vapor (in the subsequent step) cannot efficiently react with the boron in the solid state mixture. If the solid state mixture is heated to too high a temperature, the carbon source material and the silicon source material may partially react to form silicon carbide, causing the removal of boron from the silicon carbide to be more difficult. Chamber pressure that is too low consumes the material too quickly. Chamber pressure that is too high is not beneficial to the removal of boron.

After step (b), the gas mixture of first carrier gas and water vapor is conducted into the chamber in step (c) to remove boron from the solid state mixture. The water vapor can be reacted with boron in the solid state mixture to form a gaseous product, and the gaseous product will leave the solid state mixture. The first carrier gas can be argon, hydrogen, or a combination thereof. In one embodiment, the gas mixture in step (c) has a flow rate of between 100 sccm and 1000 sccm. Too slow a flow rate of the gas mixture cannot efficiently remove boron. Too fast a flow rate of the gas mixture may overly oxidize precursors. After step (c), the second carrier gas is conducted into the chamber in step (d) to remove the gaseous product of the reaction between the water vapor and boron in the solid state mixture. The second carrier gas can be argon, hydrogen, or a combination thereof. In one embodiment, the first carrier gas and the second carrier gas can be the same to simplify the process. In one embodiment, the second carrier gas in step (d) has a flow rate of between 100 sccm and 1000 sccm. Too slow a flow rate of the second carrier gas cannot efficiently remove boron. Too fast a flow rate of the second carrier gas may overly oxidize precursors. In one embodiment, several cycles of step (c) and step (d) can be repeated (e.g. 3 to 10 times) after step (d) to improve the effect of removing boron.

In one embodiment, the solid state mixture after removing boron (e.g. after step (d) or several cycles of step (c) and step (d)) can be heated to a temperature of between 1700° C. to 2200° C., and the chamber pressure is simultaneously adjusted to between 380 torr to 760 torr. As such, the carbon source material reacts with the silicon source material to form silicon carbide. After removal of the boron, the silicon carbide can be applied in many aspects. For example, the silicon carbide can be pressed into a plate, a block, or another suitable shape. On the other hand, a physical vapor transport (PVT) process can be performed on the silicon carbide after the boron is removed, thereby forming a silicon carbide crystal with low boron content.

The above process may efficiently lower the boron content in the silicon carbide or the precursor thereof (e.g. the solid state mixture). This process for removing boron belongs to a gas-solid reaction, which has the advantages of low cost and easy operation compared to conventional processes for removing boron (e.g. gas-liquid reaction or gas-gas reaction).

Some embodiments of the disclosure also provide an apparatus for removing boron to match the above method for removing boron. Note that one skilled in the art may adjust the apparatus detailed below to enable the disclosure on the basis of the disclosed concept rather than being limited to the apparatus detailed below. For example, some elements in the apparatus below can be omitted, or some elements could be added to the apparatus below. Regardless, the adjusted apparatus still enables the above method for removing boron.

In one embodiment, the apparatus 1000 for removing boron includes a chamber 200 to contain the solid state mixture of the carbon source material and the silicon source material. The apparatus 1000 also includes a carrier gas source 35 to transfer the first carrier gas to the chamber 200. The apparatus 1000 also includes a humidifier 100 connected to the chamber 200 for transferring a gas mixture of a second carrier gas and water vapor to the chamber 200. The first carrier gas and the second carrier gas can be the same type of carrier gas such as argon, hydrogen, or a combination thereof to simplify the process. In one embodiment, the humidifier 100 includes a body 11 for containing water, and a first heating element 13 at the bottom of the body 11 for heating water to form the water vapor. In one embodiment, the body 11 can be made of stainless steel, ceramic, or another common container material. In one embodiment, the first heating element 13 can be a heat plate, a resistive coil, or another common heating device. In one embodiment, the water can be injected into the body 11 through a water pipe 15. Alternatively, the cap (not especially symbolized) of the body 11 can be opened directly. After water is added into the body 11, the cap of the body 11 is then closed.

In one embodiment, the humidifier 100 includes an inlet pipe 19 for conducting the second carrier gas into water to form a gas mixture of the second carrier gas and the water vapor. In one embodiment, the inlet pipe 19, the carrier gas source 35, and the chamber 200 can be connected by a T-pipe with a valve, which may control the carrier gas source 35 to provide the first carrier gas into the chamber 200, or to provide the second carrier gas into the humidifier 100. Alternatively, the carrier gas source 35 for providing the first carrier gas into the chamber 200 is different from a carrier gas source (not shown) for providing the second carrier gas into the humidifier 100 through the inlet pipe 19. In one embodiment, the terminal of the inlet pipe 19 can be a porous diffuser 19', which may diffuse the carrier gas to from bubbles in the water, thereby increasing the mixing effect between the water vapor and the carrier gas. In one embodiment, the inlet pipe 19 and the porous diffuser 19' can be made of stainless steel or another suitable material. In one embodiment, a soft silicone pipe can be used to connect different stainless steel pipes for forming the inlet pipe 19, such that the inlet pipe 19 is movable. The humidifier 100 also includes an outlet pipe 25 for transferring the mixture of the second carrier gas and the water vapor into the chamber 200. In one embodiment, the outlet pipe 25 can be made of stainless steel or another suitable material. In one embodiment, additional stainless steel pipes can be used to connect different stainless steel pipes for forming the outlet pipe 25, such that the outlet pipe 25 is movable. The humidifier 100 also includes a water level meter at side of the body 11 and connected to the body 11 for detecting the water level in the body 11. For example, the water level 33 in the body 11 and the water level 33' in the water level meter 29 have a height difference of about 1 cm (e.g. substantially equal). If the water level 33' is too low, it will be necessary to add water into the body 11 to ensure the water vapor in the gas mixture have a suitable flow rate ratio.

In one embodiment, the humidifier 100 further includes a first temperature controller 17 for controlling the water temperature in the body 11. The terminal 17' of the first temperature controller 17 is close to the maximum water level in the body 11 for measuring the water vapor temperature. In addition, the first temperature controller 17 may control the first heating element 13. The first heating element 13 may determine whether or not to heat water in the body 11 on the basis of the water vapor temperature measured by the first temperature controller 17.

In one embodiment, the humidifier 100 further includes a second heating element 22 at the top of the body 11 for heating the top of the body 11. The humidifier 100 may further include a second temperature controller 21 for controlling the temperature of the top in the body 11. The second temperature controller 21 may measure the temperature of the top in the body 11, and control the second heating element 22. As such, the second heating element 22 may determine whether or not to heat the top in the body 11 on the basis of the temperature of the body top measured by the second temperature controller 21, thereby preventing the water vapor from being condensed by an overly low temperature of the body top. In one embodiment, the second heating element 22 can be heat plate, resistive coil, or another common heating device.

In one embodiment, the humidifier 100 further includes a third heating element 24 at sidewalls of the outlet pipe 25 for heating the outlet pipe 25. The humidifier 100 also includes a third temperature controller 23 for controlling the temperature of the outlet pipe 25. The third temperature controller 23 may measure the temperature of the outlet pipe 25, and control the third heating element 24. As such, the third heating element 24 may determine whether or not to heat the outlet pipe 25 on the basis of the temperature of the outlet pipe 25 measured by the third temperature controller 23, thereby preventing the water vapor from being condensed by an overly low temperature of the outlet pipe 25. In one embodiment, the third heating element 24 can be a heating mantle, a resistance coil, or another general heating device.

In one embodiment, the humidifier 100 further includes a gas monitor 27 connected to the outlet pipe 25 to monitor the flow rate of the gas mixture in the outlet pipe 25 and to monitor the ratio of second carrier gas to water vapor in the gas mixture. For example, the gas monitor 27 can be a gas flow meter. In one embodiment, the gas monitor 27 only measures the flow rate of the gas mixture. The ratio (e.g. flow ratio) of second carrier gas to water vapor can be calculated from the flow rate of the second carrier gas in the inlet pipe 19, the temperature and pressure of the water vapor in the body 11, and the flow rate of the gas mixture in the outlet pipe 25.

The apparatus 1000 for removing boron can be used to remove boron from the solid state mixture of the silicon source material and the carbon source material. The chamber 200 may further heat the solid state mixture after removing the boron to form silicon carbide. Note that if silicon carbide powder is put directly into the chamber 200 to perform similar processes, the boron of the silicon carbide powder cannot be removed efficiently, because the boron in the silicon carbide has a much lower diffusion coefficient than that the boron in carbon or silicon.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

100 g of silicon oxide powder serving as a silicon source material, and 40 g of graphite serving as a carbon material were evenly mixed and then put into a crucible. The boron content of the solid state mixture was about 6.1 ppm, which was analyzed by glow discharge mass spectrometry (GDMS). The crucible with the solid state mixture therein was put into a chamber of a high-temperature furnace, and then heated to 1400° C. Simultaneously, the chamber pressure in the high-temperature furnace was adjusted to 30 torr. The high-temperature furnace was connected to a humidifier. Water in the humidifier was heated to 90° C. to produce water vapor. Argon was conducted into the humidifier through an inlet pipe to serve as a carrier gas, and a gas mixture of the carrier gas and the water vapor was conducted into the chamber of 1400° C. through an outlet pipe. The gas mixture was conducted into the chamber for 10 minutes. The gas mixture had a flow rate of 200 sccm. The water vapor entered the chamber to react with the boron of the solid state mixture, and this reaction is gas-solid reaction. Afterward, conducting the gas mixture of the carrier gas and the water vapor into the chamber was stopped, and dry argon was then conducted into the chamber for a period of 10 minutes. Conducting the dry argon into the chamber was then stopped. The above cycle of conducting the gas mixture and conducting the dry argon was repeated 5 times.

The solid state mixture was then heated to 2000° C., and the chamber pressure was adjusted to 660 torr, so that the carbon source material and the silicon source material would react to form a silicon carbide powder. The boron content of the silicon carbide powder was greatly reduced to 0.7 ppm, which was analyzed by GDMS. A PVT process was performed with the silicon carbide powder to grow a silicon carbide crystal. The crystal was cut to analyze the boron concentration by secondary ion mass spectrometry (SIMS), and the boron concentration was about $5 \times 10^{17}/cm^3$ (greatly lower than the solid solubility of the boron in the silicon carbide, $10^{20}/cm^3$).

Example 2

100 g of silicon oxide powder serving as a silicon source material, and 40 g of graphite serving as a carbon material were evenly mixed and then put into the crucible. The boron content of the solid state mixture was about 5.5 ppm, which was analyzed by GDMS. The boron content difference between Examples 1 and 2 were derived from the boron content difference of the silicon source material and the carbon source material in different batches. The crucible with the solid state mixture therein was put into the chamber of the high-temperature furnace, and then heated to 1200° C. Simultaneously, the chamber pressure in the high-temperature furnace was adjusted to 30 torr. The high-temperature furnace was connected to the humidifier. Water in the humidifier was heated to 90° C. to produce water vapor. Argon was conducted into the humidifier through the inlet pipe to serve as a carrier gas, and a gas mixture of the carrier gas and the water vapor was conducted into the chamber of 1200° C. through the outlet pipe. The gas mixture was conducted into the chamber for 10 minutes. The gas mixture had a flow rate of 200 sccm. The water vapor entered the chamber to react with the boron of the solid state mixture, and this reaction belongs to gas-solid reaction. Afterward, conducting the gas mixture of the carrier gas and the water vapor into the chamber was stopped, and dry argon was then conducted into the chamber for a period of 10 minutes. Conducting the dry argon into the chamber was then stopped. The above cycle of conducting the gas mixture and conducting the dry argon was repeated 5 times.

The solid state mixture was then heated to 2000° C., and the chamber pressure was adjusted to 660 torr, such that the carbon source material and the silicon source material would react to form a silicon carbide powder. The boron content of the silicon carbide powder was greatly reduced to 0.6 ppm, which was analyzed by GDMS. A PVT process was performed with the silicon carbide powder to grow silicon carbide crystal. The crystal was cut to analyze the boron concentration by SIMS, and the boron concentration was about $7 \times 10^{16}/cm^3$ (greatly lower than the solid solubility of the boron in the silicon carbide, $10^{20}/cm^3$).

Comparative Example 1

100 g of silicon carbide powder was put into the crucible. The boron content of the silicon carbide powder was about 5.5 ppm, which was analyzed by GDMS. The crucible with the silicon carbide powder therein was put into the chamber of the high-temperature furnace, and then heated to 1400° C. Simultaneously, the chamber pressure in the high-temperature furnace was adjusted to 30 torr. The high-temperature furnace was connected to the humidifier. Water in the humidifier was heated to 90° C. to produce water vapor. Argon was conducted into the humidifier through the inlet pipe to serve as a carrier gas, and a gas mixture of the carrier gas and the water vapor was conducted into the chamber of 1400° C. through the outlet pipe. The gas mixture was conducted into the chamber for 10 minutes. The gas mixture had a flow rate of 200 sccm. The water vapor entered the chamber to react with the boron of the silicon carbide powder, and this reaction belongs to gas-solid reaction. Afterward, conducting the gas mixture of the carrier gas and the water vapor into the chamber was stopped, and dry argon was then conducted into the chamber for a period of 10 minutes. Conducting the dry argon into the chamber was then stopped. The above cycle of conducting the gas mixture and conducting the dry argon was repeated 5 times. The silicon carbide powder had a boron content of about 5.2 ppm, which was analyzed by GDMS. Accordingly, if the silicon carbide powder directly reacted with the water vapor, the boron in the silicon carbide could not be efficiently removed.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method for removing boron, comprising:
   (a) mixing a carbon source material and a silicon source material in a chamber to form a solid state mixture;
   (b) heating the solid state mixture to a temperature of 1000° C. to 1600° C., and adjusting pressure of the chamber to 1 torr to 100 torr;
   (c) conducting a gas mixture of a first carrier gas and water vapor into the chamber to remove boron from the solid state mixture; and
   (d) conducting a second carrier gas into the chamber.

2. The method as claimed in claim 1, wherein the carbon source material comprises carbon black, graphite, graphene, carbon nanotube, or a combination thereof.

3. The method as claimed in claim 1, wherein the silicon source material comprises silicon, silicon oxide, or a combination thereof.

4. The method as claimed in claim 1, wherein the first carrier gas and the second carrier gas comprise argon, hydrogen, or a combination thereof.

5. The method as claimed in claim 1, wherein the gas mixture in step (c) has a flow rate of 100 sccm to 1000 sccm.

6. The method as claimed in claim 1, wherein the second carrier gas in step (d) has a flow rate of 100 sccm to 1000 sccm.

7. The method as claimed in claim 1, further repeating a cycle of step (c) and (d) after step (d).

8. The method as claimed in claim 1, further comprising step (e) heating the solid state mixture to a temperature of 1700° C. to 2200° C. and adjusting the pressure of the chamber to 380 torr to 760 torr after step (d) of the method for removing boron, thereby reacting the carbon source material and the silicon source material to form a silicon carbide.

* * * * *